(12) United States Patent
Tsuchida et al.

(10) Patent No.: US 11,923,510 B2
(45) Date of Patent: Mar. 5, 2024

(54) SOLID-STATE BATTERY AND METHOD OF MANUFACTURE THEREOF

(71) Applicant: Panasonic Intellectual Property Management Co., Ltd., Osaka (JP)

(72) Inventors: Shuzo Tsuchida, Nara (JP); Kazufumi Miyatake, Osaka (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 16/739,110

(22) Filed: Jan. 9, 2020

(65) Prior Publication Data

US 2020/0243914 A1     Jul. 30, 2020

(30) Foreign Application Priority Data

Jan. 30, 2019   (JP) .................................. 2019-014603

(51) Int. Cl.
   *H01M 10/0525*   (2010.01)
   *H01M 10/0585*   (2010.01)

(52) U.S. Cl.
   CPC ... *H01M 10/0585* (2013.01); *H01M 10/0525* (2013.01); *H01M 2300/0094* (2013.01)

(58) Field of Classification Search
   CPC ....................... H01M 10/0525; H01M 10/0585
   See application file for complete search history.

(56) References Cited

U.S. PATENT DOCUMENTS

| | | | |
|---|---|---|---|
| 2009/0226816 A1 | 9/2009 | Yoshida et al. | |
| 2010/0124705 A1 | 5/2010 | Naoi et al. | |
| 2012/0115028 A1 | 5/2012 | Ueno et al. | |
| 2014/0199598 A1* | 7/2014 | Hoshina et al. | H01M 10/0525 |
| | | | 429/322 |
| 2015/0270536 A1 | 9/2015 | Kawakami et al. | |
| 2016/0072120 A1 | 3/2016 | Mizutani | |
| 2017/0338478 A1 | 11/2017 | Kawakami et al. | |
| 2018/0269532 A1* | 9/2018 | Teraoka ............. | H01M 10/052 |

FOREIGN PATENT DOCUMENTS

| | | |
|---|---|---|
| JP | 2003-59492 | 2/2003 |
| JP | 2009-187911 | 8/2009 |
| JP | 2010-121029 | 6/2010 |
| JP | 2012-104270 | 5/2012 |
| JP | 2016-509739 | 3/2016 |

(Continued)

*Primary Examiner* — Osei K Amponsah
(74) *Attorney, Agent, or Firm* — WENDEROTH, LIND & PONACK L.L.P.

(57) ABSTRACT

A solid-state battery that exhibits improved battery performance includes: a positive-electrode collector; a negative-electrode collector; a positive electrode layer formed on the positive-electrode collector and containing a positive-electrode active material and a solid electrolyte; a negative electrode layer formed on the negative-electrode collector and containing a negative-electrode active material and a solid electrolyte; and a solid electrolyte layer disposed between the positive electrode layer and the negative electrode layer and containing a solid electrolyte. At least one of the solid electrolyte and the solid electrolyte partly represents a porous solid electrolyte.

16 Claims, 8 Drawing Sheets

(56) References Cited

FOREIGN PATENT DOCUMENTS

| JP | 2016-058277 | 4/2016 |
| JP | 2018-521173 | 8/2018 |
| JP | 2018-206727 | 12/2018 |
| WO | 2008/059987 | 5/2008 |
| WO | 2013/136488 | 9/2013 |
| WO | 2016/210371 | 12/2016 |

* cited by examiner

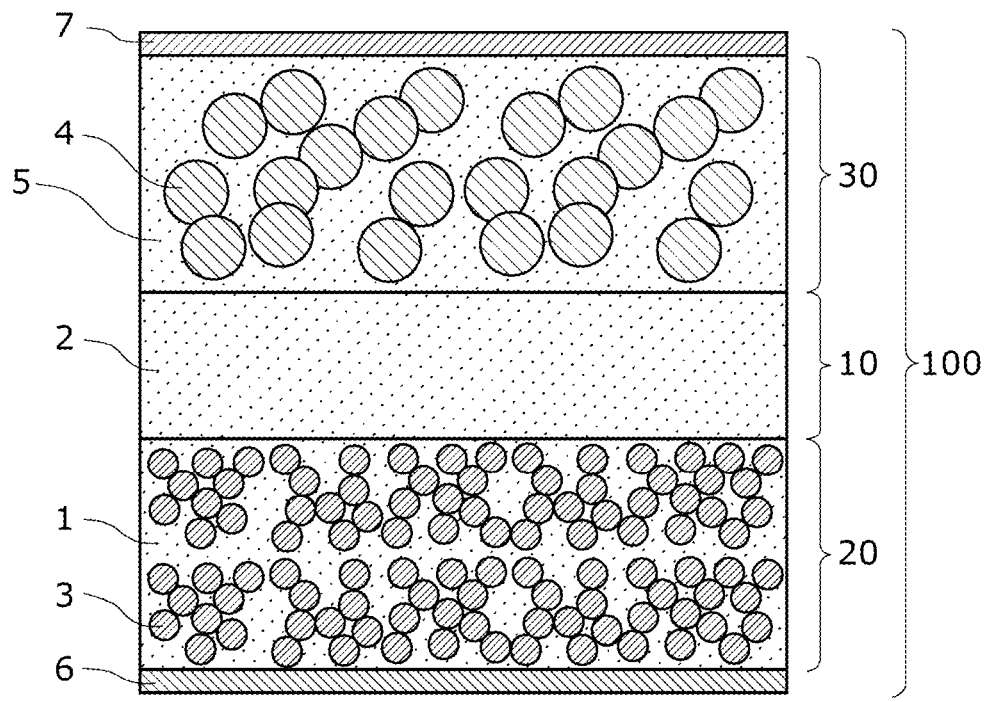

SOLID-STATE BATTERY AND METHOD OF MANUFACTURE THEREOF

TECHNICAL FIELD

The present disclosure relates to solid-state batteries and methods for manufacturing solid-state batteries. Particularly, the present disclosure relates to a solid-state battery that includes a positive electrode layer, a negative electrode layer, and a solid electrolyte layer, and to a method for manufacturing such a solid-state battery.

BACKGROUND

In recent years, electronic devices such as personal computers and smartphones have been becoming light and cordless, and due to these features, development of repeatedly reusable secondary batteries have been desired. Examples of such secondary batteries include nickel cadmium batteries, nickel-hydrogen batteries, lead-acid batteries, and lithium-ion batteries. Among these, the lithium-ion batteries have been attracting attention because of characteristics such as light weight, high voltage, and high energy density.

Development of a high-capacity secondary battery is regarded as important also in the field of automobiles such as electric vehicles and hybrid vehicles, and there has been more and more demand for lithium-ion batteries.

A lithium-ion battery includes a positive electrode layer, a negative electrode layer, and an electrolyte disposed between these electrode layers. The electrolyte is, for example, an electrolytic solution prepared by dissolving a supporting electrolyte, such as lithium hexafluorophosphate, in an organic solvent. A solid electrolyte can be also used. Lithium-ion batteries that are currently in wide use are flammable since the electrolytic solution used in these batteries contains an organic solvent. Materials, structures, and systems are therefore needed to ensure the safety of lithium-ion batteries. It is expected that the materials, structures, and systems needed for lithium-ion batteries can be simplified by using a nonflammable solid electrolyte as the electrolyte. In addition, it is considered that using a solid electrolyte makes it possible to increase energy density, reduce manufacturing costs, and improve productivity. Hereinafter, a battery using a solid electrolyte will be referred to as "solid-state battery".

Solid electrolytes can be broadly classified into organic solid electrolytes and inorganic solid electrolytes. An organic solid electrolyte has an ion conductivity of about $10^{-6}$ S/cm at 25° C., which is much lower than the ion conductivity of an electrolytic solution of about $10^{-3}$ S/cm. It is accordingly difficult for a solid-state battery using an organic solid electrolyte to operate at a temperature of 25° C. Inorganic solid electrolytes include oxide solid electrolytes and sulfide solid electrolytes. These have a relatively high ion conductivity of about $10^{-4}$ to $10^{-3}$ S/cm. Oxide solid electrolytes have high grain boundary resistivities, and there have been efforts to decrease grain boundary resistivity by sintering of a powder or by reducing thickness of a film. However, sintering of a powder involves high temperature and causes the constituent elements of the positive or negative electrode to interdiffuse with the constituent elements of the solid electrolyte. This makes it difficult to obtain sufficient characteristics. The approach has therefore shifted to reducing the thickness of solid-state batteries that use oxide solid electrolytes. However, there are difficulties in increasing the size of thin solid-state batteries, and this type of solid-state battery is not suited for increasing battery capacity.

Sulfide solid electrolytes have lower grain boundary resistivities than oxide solid electrolytes, and desirable characteristics can be achieved simply by compression molding of a powder, without sintering. In fact, sulfide solid electrolytes are actively used in recent studies of large-format coating-type solid-state batteries for development of larger and higher-capacity solid-state batteries.

A coating-type solid-state battery includes: a positive electrode layer formed on a collector formed of a metal foil, and containing a positive-electrode active material, a solid electrolyte, and a binder; a negative electrode layer formed on a collector formed of a metal foil, and containing a negative-electrode active material, a solid electrolyte, and a binder; and a solid electrolyte layer disposed between the positive electrode layer and the negative electrode layer and containing a solid electrolyte and a binder. (In the following, the positive-electrode active material and the negative-electrode active material also will be referred to collectively as "active material".) The binder contained in the positive electrode layer, the negative electrode layer, or the solid electrolyte is needed to increase the adhesion strength (1) between powders in the positive electrode layer and in the negative electrode layer (e.g., between powders of active material, between the active material and the solid electrolyte, and between powders of solid electrolyte), (2) between the layers, and between the layer and the collector, and (3) between the solid electrolytes contained in the solid electrolyte layer. (In the following, the boundary between these materials will be referred to also as "interface".) The binder has a much lower ion conductivity than the solid electrolyte, and causes a performance drop in the battery, for example, such as in battery capacity. As it currently stands, only a small amount of binder can be added in order not to cause such a battery performance drop. This causes the problematic detachment at the interface due to expansion and contraction of the active material after charge and discharge of the battery, and due to the impact of the environment in which the battery is used. Such detachment at the interface leads to deterioration of the solid-state battery.

SUMMARY

JP-A-2012-104270 discloses a solid-state battery in which voids are provided in the positive or negative electrode layer, and the positive or negative electrode layer has a porosity difference along a direction of its thickness as a means to relieve the stress caused by expansion and contraction due to charge and discharge of the solid-state battery.

However, while the solid-state battery of the foregoing related art can produce a stress relieving effect with the voids, the ion conductivity of the positive or negative electrode layer decreases because of the large number of voids. Another problem is that, though deterioration of the solid-state battery is reduced, the battery involves a performance drop because of ineffective use of the active material in the positive or negative electrode layer.

The present disclosure has been made according to the above described circumstances, and it is an object of the present disclosure to provide a solid-state battery that exhibits improved battery performance with reduced deterioration in use. The present disclosure is also intended to provide a method for manufacturing such a solid-state battery.

A solid-state battery according to an aspect of the present disclosure comprises:
- a positive-electrode collector;
- a negative-electrode collector;
- a positive electrode layer formed on a surface of the positive-electrode collector closer to the negative-electrode collector, and containing a positive-electrode active material and a first solid electrolyte;
- a negative electrode layer formed on a surface of the negative-electrode collector closer to the positive-electrode collector, and containing a negative-electrode active material and a second solid electrolyte; and
- a solid electrolyte layer disposed between the positive electrode layer and the negative electrode layer and containing a third solid electrolyte,
- at least one of the first solid electrolyte and the second solid electrolyte containing a porous solid electrolyte.

A solid-state battery manufacturing method according to an aspect of the present disclosure is a method for manufacturing a solid-state battery that includes a positive electrode layer and a negative electrode layer, the method comprising at least one of:
- forming the positive electrode layer with an active material mixture produced by mixing a positive-electrode active material, a solid electrolyte particle having a particle diameter of larger than 300 nm, and a solid electrolyte particle having a particle diameter of 300 nm or less; and
- forming the negative electrode layer with an active material mixture produced by mixing a negative-electrode active material, a solid electrolyte particle having a particle diameter of larger than 300 nm, and a solid electrolyte particle having a particle diameter of 300 nm or less.

The solid-state battery according to the aspect of the present disclosure can exhibit improved battery performance with reduced deterioration in use.

BRIEF DESCRIPTION OF THE DRAWINGS

FIG. 1 is a schematic view showing a cross section of a solid-state battery of an embodiment.

DESCRIPTION OF EMBODIMENTS

Figure 2A:
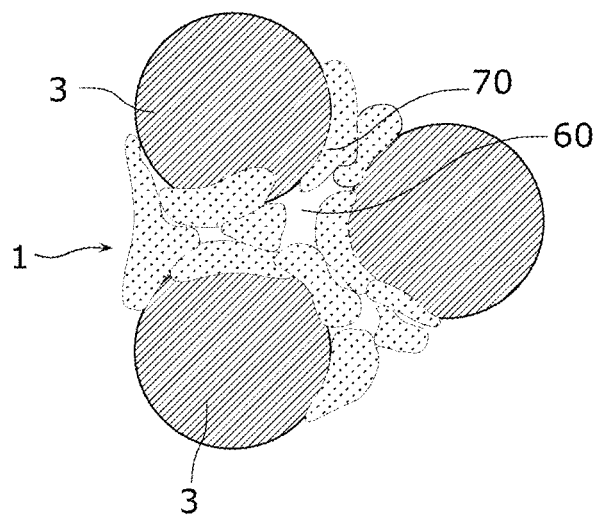
FIG. 2A is a schematic view showing a cross section of a positive-electrode active material and a solid electrolyte of the embodiment before charging.

A solid-state battery of an aspect of the present disclosure includes: a positive-electrode collector; a negative-electrode collector; a positive electrode layer formed on the surface of the positive-electrode collector closer to the negative-electrode collector, and containing a positive-electrode active material and a first solid electrolyte; a negative electrode layer formed on the surface of the negative-electrode collector closer to the positive-electrode collector, and containing a negative-electrode active material and a second solid electrolyte; and a solid electrolyte layer disposed between the positive electrode layer and the negative electrode layer and containing a third solid electrolyte. At least one of the first solid electrolyte and the second solid electrolyte contains a porous solid electrolyte.

With this construction, the porous solid electrolyte is contained in at least one of the positive electrode layer and the negative electrode layer, and is disposed around the active material. The porous solid electrolyte has fine empty spaces, which relieve the stress generated as a result of expansion and contraction of the active material due to charge and discharge, and the stress created by the impact of the environment in which the battery is used. This reduces deterioration of the solid-state battery in use. The solid electrolyte material in the porous solid electrolyte also serves as an ion conduction pathway in the positive electrode layer or the negative electrode layer. This improves the battery performance, including battery capacity.

The porous solid electrolyte may contain, for example, a fibrous solid electrolyte.

The fibrous solid electrolyte in the porous solid electrolyte increases flexibility. In this way, the battery is able to follow the shape changes due to expansion and contraction of the active material, making it possible to relieve the stress due to expansion and contraction of the active material, and to maintain the shape of the porous solid electrolyte.

For example, the fibrous solid electrolyte may be in contact with at least one of the positive-electrode active material and the negative-electrode active material.

In this way, the fibrous solid electrolyte, with its high flexibility, is able to follow the shape changes due to expansion and contraction of the active material. It is also possible to increase the number of contact points between the fibrous solid electrolyte and the active material, making it possible to maintain the ion conduction pathway in the positive electrode layer or the negative electrode layer.

The fibrous solid electrolyte may contain, for example, a fiber having a width of 10 nm to 300 nm.

By being confined within a certain range of fiber width, the fibers in the fibrous solid electrolyte can satisfy both strength and flexibility. This improves the stress relieving effect.

For example, the porous solid electrolyte may contain a plurality of fine particulate solid electrolytes, and the plurality of fine particulate solid electrolytes may be joined to one another via solid electrolyte junctions.

This renders the porous solid electrolyte with a shape where the fine particulate solid electrolytes are joined to one another. This increases the fraction of the solid electrolyte material in the porous solid electrolyte, making the stress relieving effect more effective against a relatively large stress.

For example, the plurality of fine particulate solid electrolytes may be partly in contact with at least one of the positive-electrode active material and the negative-electrode active material.

In this way, the plurality of fine particulate solid electrolytes will be present on the active material surface. This makes it easier to follow the shape changes due to expansion and contraction of the active material, and to maintain the ion conduction pathway in the positive electrode layer or the negative electrode layer. Another advantage is that, even in the event where the active material surface has generated gas, the gas can be released through the gaps between the fine particulate solid electrolytes. This makes it possible to reduce detachment of the solid electrolyte due to the generated gas.

The junctions may include, for example, a junction having a width of 10 nm to 300 nm.

With the junction of a certain width being in contact with the plurality of fine particulate solid electrolytes, the positive electrode layer or the negative electrode layer can have a structure that satisfies both strength and flexibility, and the stress relieving effect improves.

For example, the area fraction of the space created by pores in the porous solid electrolyte may be 5% to 90% with respect to the total area of the porous solid electrolyte, as measured in a two dimensionally observed image.

In this way, the ratio of the space created by pores to the solid electrolyte material in the porous solid electrolyte falls in a certain range, making it possible to provide both the stress relieving effect and an ion conduction pathway.

For example, at least one of the positive-electrode active material and the negative-electrode active material may have a surface coating layer containing solid electrolyte particles.

This increases the contact area between the active material and the solid electrolyte, and the ion conductivity can further improve.

For example, the solid electrolyte particles may include a solid electrolyte particle having a particle diameter of 300 nm or less, and a solid electrolyte particle having a particle diameter of larger than 300 nm.

In this way, the solid electrolyte particles can exist as a mixture of solid electrolyte particles of a relatively larger diameter providing desirable dispersibility, and solid electrolyte particles of a relatively smaller diameter providing desirable adhesion. This makes it possible to satisfy both desirable dispersibility, and desirable adhesion of the solid electrolyte particles for active material surface.

For example, the solid electrolyte particles having a particle diameter of larger than 300 nm may have a volume fraction of 20% to 95% with respect to the total volume of the solid electrolyte particles.

With the proportion of the relatively larger solid electrolyte particles falling in a certain range, the coating layer can be more evenly formed on the active material.

With regard to the volume fraction of the positive-electrode active material with respect to the total volume of the positive-electrode active material and the first solid electrolyte, and the volume fraction of the negative-electrode active material with respect to the total volume of the negative-electrode active material and the second solid electrolyte, at least one of these volume fractions may be, for example, 60% to 80%.

In this way, the ratio of the active material providing an electron conduction pathway to the solid electrolyte providing an ion conduction pathway falls in a certain range. This makes it easier to satisfy both ion conduction pathway and electron conduction pathway, and the battery performance further improves.

A solid-state battery manufacturing method according to an aspect of the present disclosure is a method for producing a solid-state battery that includes a positive electrode layer and a negative electrode layer. The method includes at least one of the following:

forming the positive electrode layer with an active material mixture produced by mixing a positive-electrode active material, a solid electrolyte particle having a particle diameter of larger than 300 nm, and a solid electrolyte particle having a particle diameter of 300 nm or less; and forming the negative electrode layer with an active material mixture produced by mixing a negative-electrode active material, a solid electrolyte particle having a particle diameter of larger than 300 nm, and a solid electrolyte particle having a particle diameter of 300 nm or less.

In this way, the fine solid electrolyte particle having a particle diameter of 300 nm or less is able to form a porous solid electrolyte, and a solid-state battery can be manufactured in which the porous solid electrolyte is contained in at least one of the positive electrode layer and the negative electrode layer, and is disposed around the active material.

The solid-state battery manufacturing method may be adapted so that, for example, the active material mixture is produced by mixing the active material with the solid electrolyte particle having a particle diameter of 300 nm or less and then by adding and mixing the solid electrolyte particle having a particle diameter of larger than 300 nm.

In this way, the solid electrolyte particle having a relatively smaller particle diameter of 300 nm or less can improve its dispersibility.

The following more specifically describes the present embodiment with regard to the solid-state battery, and to the solid electrolyte layer, the positive electrode layer, and the negative electrode layer constituting the solid-state battery. The embodiment below represents a comprehensive and specific implementation. It is also to be noted that the features described in the embodiment below, including numerical values, shapes, materials, constituents, the layouts and interconnections of constituents, and steps are merely examples, and are not intended to limit the present disclosure. Among the constituents described in the embodiment below, constituents not recited in the most generic, independent claims are described as being arbitrary or optional.

In the specification, languages describing relationships between elements, such as in elements being parallel to each other, languages describing shapes of elements, such as in elements being rectangular, and ranges of numerical values are not to be construed in a strict sense. For example, a given range of numerical values is inclusive of substantially the same numerical range with a difference of about several percent.

The drawings attached herewith are schematic views with emphasizations, omissions, or adjusted proportions, which are appropriately incorporated for the purpose of describing the present disclosure. Accordingly, the drawings are not strict representations of the present disclosure, and do not necessarily represent the actual shapes, positional relationships, and proportions. In the drawings, the same reference numerals are used to refer to substantially the same configurations, and descriptions of such common configurations may be omitted or simplified.

As used herein, the terms "top" and "bottom" used in conjunction with a configuration of the solid-state battery are not intended to mean up (vertically up) and down (vertically down) in an absolute sense of space recognition, but represent terms that are determined by a relative positional relationship based on the order in which layers are laminated in a layered structure. The terms "on" and "under" are used not only when describing two elements that are disposed by being separated from each other with an intervening element, but when describing two elements that are disposed in contact with each other with no space in between.

In the specification, the cross sections shown in the cross sectional views are cross sections taken across the layers at the center of a solid-state battery.

Embodiments

Configuration
A. Solid-State Battery

A solid-state battery of the present embodiment is described below, with reference to FIG. 1. FIG. 1 is a schematic view showing across section of a solid-state battery 100 of the present embodiment. The solid-state battery 100 of the present embodiment includes: a positive-electrode collector 6 formed of a metal foil; a negative-electrode collector 7 formed of a metal foil; a positive electrode layer 20 formed on the surface of the positive-electrode collector 6 closer to the negative-electrode collector 7, and containing a positive-electrode active material 3 and a solid electrolyte 1; a negative electrode layer 30 formed on the surface of the negative-electrode collector 7 closer to the positive-electrode collector 6, and containing a negative-electrode active material 4 and a solid electrolyte 5; and a solid electrolyte layer 10 disposed between the positive electrode layer 20 and the negative electrode layer 30 and containing at least a solid electrolyte 2 having ion conductivity. A binder may be added to the positive electrode layer 20, the negative electrode layer 30, and the solid electrolyte layer 10, as needed. Though not illustrated in FIG. 1, at least one of the solid electrolyte 1 and the solid electrolyte 5 contains a porous solid electrolyte, as will be described later in detail.

In the present embodiment, the solid electrolyte 1 is an example of a first solid electrolyte, the solid electrolyte 5 is an example of a second solid electrolyte, and the solid electrolyte 2 is an example of a third solid electrolyte.

The solid-state battery 100 is produced by forming the positive electrode layer 20, the negative electrode layer 30, and the solid electrolyte layer 10 in such a manner that the positive electrode layer 20 containing the positive-electrode active material 3 is formed on the positive-electrode collector 6 formed of a metal foil, the negative electrode layer 30 containing the negative-electrode active material 4 is formed on the negative-electrode collector 7 formed of a metal foil, and the solid electrolyte layer 10 containing the solid electrolyte 2 having ion conductivity is disposed between the positive electrode layer 20 and the negative electrode layer 30. A pressure of, for example, 100 MPa to 1,000 MPa is then externally applied to the positive-electrode collector 6 and the negative-electrode collector 7 from both sides to complete the solid-state battery 100 having a filling rate of 60% or more and less than 100% in at least one of the layers. With a filling rate of at least 60% in at least one of the layers, fewer voids are produced in the solid electrolyte layer 10, the positive electrode layer 20, or the negative electrode layer 30. This facilitates conduction of more lithium (Li) ions and electrons, and produces desirable charge and discharge characteristics. As used herein, "filling rate" refers to a volume fraction of material in the total volume, excluding the voids present in the material.

After being pressed, the solid-state battery 100 is housed in a casing after attaching terminals to the battery. Examples of the casing of the solid-state battery 100 include an aluminum laminate pouch, a SUS casing, an iron casing, an aluminum casing, and a resin casing.

The following describes the solid-state battery 100 of the present embodiment with regards to features of the positive electrode layer 20 and/or the negative electrode layer 30. Because these members share many common features, the following detailed descriptions focus on the positive electrode layer 20, as an example.

Figure 2B:
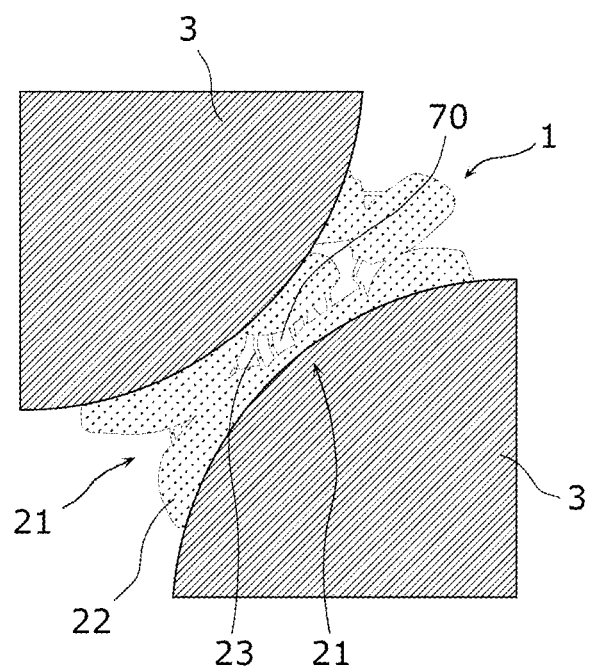
FIG. 2B is a schematic view showing a cross section of the solid electrolyte between particles of positive-electrode active material before charging in the embodiment.

FIG. 2A is a schematic view showing a cross section of the positive-electrode active material 3 and the solid electrolyte 1 in the positive electrode layer 20 of the present embodiment before charging. FIG. 2B is an enlarged view showing a cross section of the solid electrolyte 1 between particles of positive-electrode active material 3. The positive-electrode active material 3 and the solid electrolyte 1 are also present vertically behind the plane of the paper, though these are omitted in FIGS. 2A and 2B. As illustrated in FIG. 2A, the positive electrode layer 20 is structured to include the solid electrolyte 1 filling the space between particles of positive-electrode active material 3. As illustrated in FIG. 2A, the solid electrolyte 1 is not necessarily required to completely fill the space between particles of positive-electrode active material 3, and a void 60 may exist in a part of these spaces. The filling rate depends on the number of voids 60. The number of voids 60 can be adjusted within the foregoing range of filling rate by, for example, varying the applied pressure of pressing.

As illustrated in FIG. 2B, the solid electrolyte 1 exists between particles of positive-electrode active material 3, and contains a porous solid electrolyte 21. The solid electrolyte 1 has a plurality of fine spaces 70 each measuring 10 nm to 500 nm in width or length. Aside from the fine spaces 70, the solid electrolyte 1 includes a particulate solid electrolyte 22 and a fibrous solid electrolyte 23.

The solid electrolyte 1 having a plurality of fine spaces 70, or, specifically, the porous solid electrolyte 21, is joined by the fibrous solid electrolyte 23, which is a solid electrolyte material of a predetermined width and length, confining the fine spaces 70. That is, the porous solid electrolyte 21 is at least a part of the solid electrolyte 1. The porous solid electrolyte 21 contains the fibrous solid electrolyte 23 in its structure.

Figure 3A:
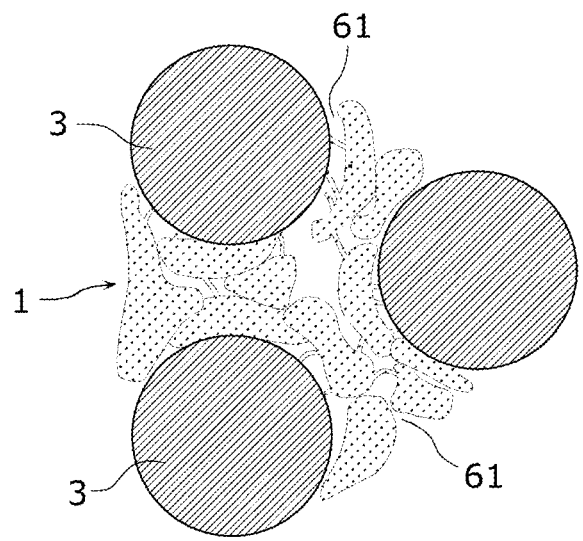
FIG. 3A is a schematic view showing a cross section of the positive-electrode active material and the solid electrolyte of the embodiment during charging.
Figure 3B:
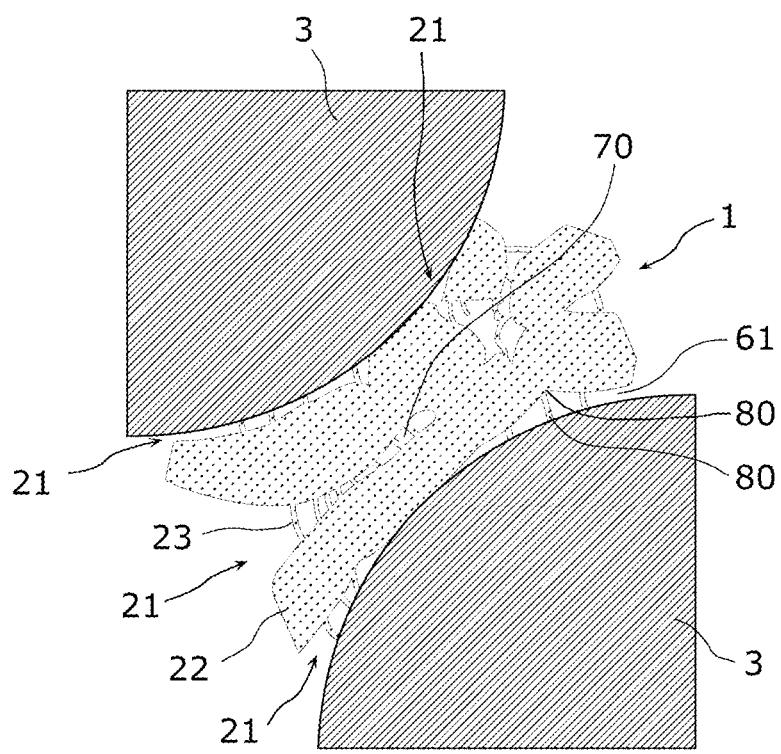
FIG. 3B is a schematic view showing a cross section of the solid electrolyte between particles of positive-electrode active material during charging in the embodiment.

FIG. 3A is a schematic view showing a cross section of the positive-electrode active material 3 and the solid electrolyte 1 of the present embodiment during charging. FIG. 3B is an enlarged view showing a cross section of the solid electrolyte 1 between particles of positive-electrode active material 3 during charging. The positive-electrode active material 3 and the solid electrolyte 1 are also present vertically behind the plane of the paper, though these are omitted in FIGS. 3A and 3B. During charging, the positive-electrode active material 3 undergoes contraction as it releases lithium. On the other hand, the solid electrolyte 1 that is present around the positive-electrode active material 3 hardly changes its volume, and cannot follow the contraction of the positive-electrode active material 3, causing a void 61 to generate at the interface between the solid electrolyte 1 and the positive-electrode active material 3, or at the interface between portions of the solid electrolyte 1 during charging. In the solid-state battery 100 of the present embodiment, the fibrous solid electrolyte 23 formed of solid electrolyte material joins the particulate solid electrolyte 22 to the positive-electrode active material 3, and joins the particulate solid electrolytes 22 to one another, via contacts 80 in the void 61. That is, the fibrous solid electrolyte 23 and the positive-electrode active material 3 are in contact with each other. The fibrous solid electrolyte 23 provides an ion conduction pathway in the positive electrode layer 20, and can reduce deterioration of battery characteristics, for example, charge capacity, of the solid-state battery 100.

Discharge is the opposite of the foregoing mechanism, causing lithium to enter the positive-electrode active material 3, and the positive-electrode active material 3 to expand. The presence of fine spaces 70 relieves the stress caused by expansion of the positive-electrode active material 3, and reduces cracking in the positive electrode layer 20. This reduces deterioration of the solid-state battery 100.

Preferably, the fibrous solid electrolyte 23 contains fibers having a width of 10 nm to 300 nm. With a fiber width of 10 nm to 300 nm, the fibers can satisfy both strength and flexibility in the fibrous solid electrolyte, and the stress relieving effect improves.

The foregoing descriptions are based on an example in which the positive-electrode active material contracts during charging, and expands during discharge. However, the same effect can be obtained under the same principle when the positive-electrode active material is adapted to expand during charging, and contract during discharge. That is, the positive-electrode active material used is not particularly limited. The foregoing descriptions based on the positive electrode layer 20 are also applicable to the negative electrode layer 30. In this case, the negative-electrode active material expands and contracts during charging and discharge, and can produce the foregoing effect when it contains the porous solid electrolyte.

Instead of containing the fibrous solid electrolyte 23, the porous solid electrolyte 21 may contain a plurality of fine particulate solid electrolytes, and these fine particulate solid electrolytes may be joined to one another via solid electrolyte junctions. The shape of porous solid electrolyte can be adjusted by varying manufacturing conditions, as will be described later in detail.

Figure 4A:
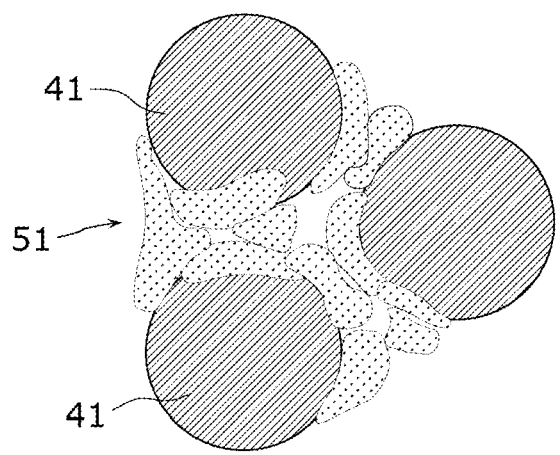
FIG. 4A is a schematic view showing a cross section of a positive-electrode active material and a solid electrolyte of related art before charging.
Figure 4B:
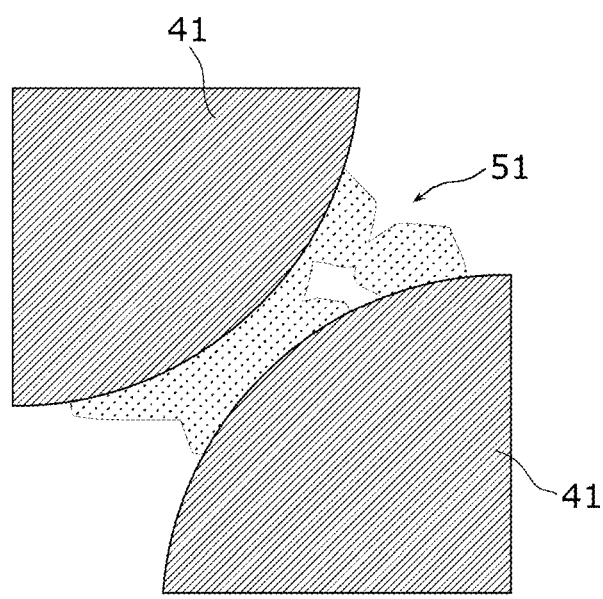
FIG. 4B is a schematic view showing a cross section of the solid electrolyte between particles of positive-electrode active material before charging in the related art.

FIG. 4A is a schematic view showing a cross section of a positive-electrode active material 41 and a solid electrolyte 51 in a positive electrode layer of related art before charging. FIG. 4B is an enlarged view showing a cross section of the solid electrolyte 51 between particles of positive-electrode active material 41 before charging. The positive-electrode active material 41 and the solid electrolyte 51 are also present vertically behind the plane of the paper, though these are omitted in FIGS. 4A and 4B. The positive electrode layer contains the positive-electrode active material 41 and the solid electrolyte 51. The solid electrolyte 51 is filling the space between particles of positive-electrode active material 41. The positive electrode layer of related art has the same basic configuration as that shown in FIGS. 2A and 2B. However, the positive electrode layer of related art does not actively incorporate the porous space (the plurality of fine spaces 70) shown in FIG. 2B.

Figure 5A:
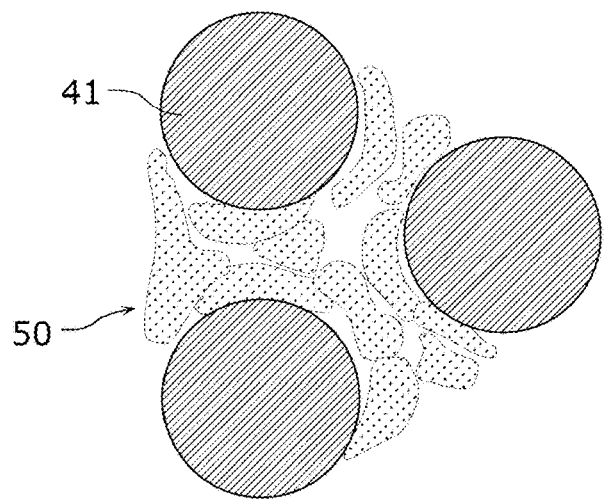
FIG. 5A is a schematic view showing a cross section of the positive-electrode active material and the solid electrolyte of the related art during charging.
Figure 5B:
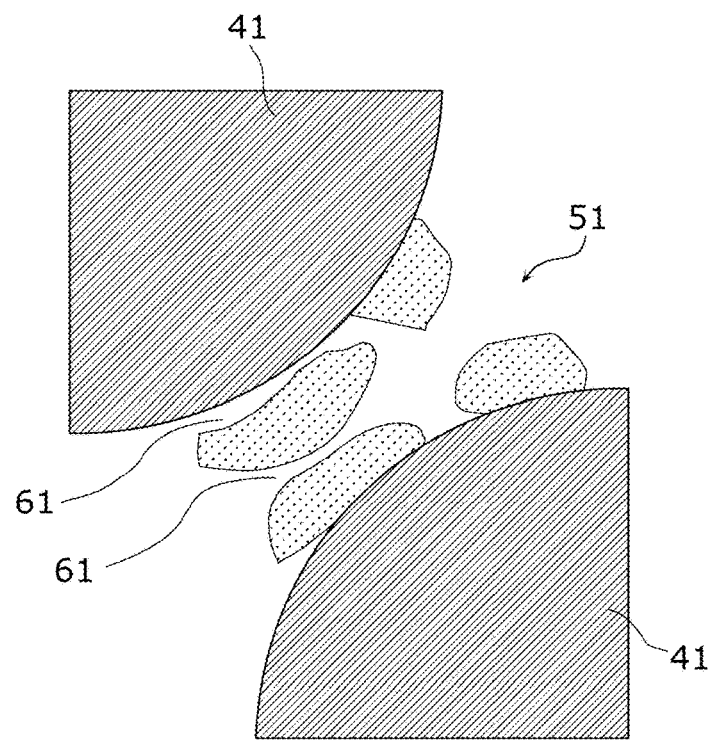
FIG. 5B is a schematic view showing a cross section of the solid electrolyte between particles of positive-electrode active material during charging in the related art.

FIG. 5A is a schematic view showing a cross section of the positive-electrode active material 41 and the solid electrolyte 51 of related art during charging. FIG. 5B is an enlarged view showing a cross section of the solid electrolyte 51 between particles of positive-electrode active material 41 during charging. The positive-electrode active material 41 and the solid electrolyte 51 are also present vertically behind the plane of the paper, though these are omitted in FIGS. 5A and 5B. As with the case of the positive-electrode active material 3 shown in FIG. 3B, the positive-electrode active material 41 releases lithium, and contracts during charging. However, the solid electrolyte 51 that is present around the positive-electrode active material 41 hardly changes its volume, and cannot easily follow the contraction of the positive-electrode active material 41, causing a void 61 to generate during charging. Unlike FIG. 3B, the solid electrolyte 51 does not actively incorporate the fibrous solid electrolyte 23 and the plurality of fine spaces 70, and cannot provide a sufficient conduction pathway for lithium ions released by the positive-electrode active material 41. In this case, it is not possible to make efficient use of the positive-electrode active material 41, and desirable charge characteristics cannot be obtained.

Discharge is the opposite of the foregoing mechanism, causing lithium to enter the positive-electrode active material 41, and the positive-electrode active material 41 to expand. The positive electrode layer shown in FIG. 4B cannot produce the stress relieving effect produced by the fine spaces 70 of FIG. 2B against expansion of the positive-electrode active material 41, and is susceptible to cracking. This facilitates deterioration of the solid-state battery.

B. Solid Electrolyte Layer

The following describes the solid electrolyte layer. The solid electrolyte layer 10 of the present embodiment contains the solid electrolyte 2. The solid electrolyte layer 10 may contain a binder, in addition to the solid electrolyte 2.

B-1. Solid Electrolyte

The solid electrolyte 2 of the present embodiment is described below. The solid electrolyte material used for the solid electrolyte 2 can be broadly classified into three kinds of commonly known materials: sulfide solid electrolytes, halide solid electrolytes, and oxide solid electrolytes. The solid electrolyte material may be selected from any of sulfide solid electrolytes, halide solid electrolytes, and oxide solid electrolytes. The sulfide solid electrolyte used in the present embodiment is not particularly limited, and may be, for example, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, or $Li_2S$—$P_2S_5$. For desirable lithium ion conductivity, it is preferable that the sulfide solid electrolyte contain Li, P, and S. A $P_2S_5$-containing sulfide solid electrolyte is also preferred because $P_2S_5$ is highly reactive to the binder, and forms a strong bond with the binder. Here, the notation "$Li_2S$—$P_2S_5$" means a sulfide solid electrolyte of a feedstock composition containing $Li_2S$ and $P_2S_5$. The notation used for other types of solid electrolytes has the same meaning.

In the present embodiment, the sulfide solid electrolyte material is, for example, a sulfide-base glass ceramic containing $Li_2S$ and $P_2S_5$. The fractions of $Li_2S$ and $P_2S_5$ are such that $Li_2S:P_2S_5$ is preferably within a range of 70:30 to 80:20, more preferably 75:25 to 80:20 in terms of a molar ratio. These $Li_2S$-to-$P_2S_5$ ratios are preferred because it produces a high-ion-conductivity crystalline structure while maintaining the Li concentration, which affects battery characteristics. Another reason is that, with these ratios, $P_2S_5$ can be contained in amounts necessary for reaction and binding with the binder.

B-2. Binder

The binder of the present embodiment is described below. The binder is a material having no ion conductivity or electron conductivity, and it serves to bond materials in the solid electrolyte layer 10, and bond the solid electrolyte layer 10 to the other layers. The binder of the present embodiment may contain a thermoplastic elastomer having a functional group introduced therein that improves adhesion strength. The functional group may be a carbonyl group, and, from the viewpoint of improving adhesion strength, the carbonyl group may be a maleic acid anhydride. Oxygen atoms in maleic acid anhydride react with the solid electrolyte 2, and the binder binds to the solid electrolyte 2, forming a structure in which the binder is interposed between the solid electrolytes 2. This improves the adhesion strength.

It is possible to use a thermoplastic elastomer, for example, such as styrene-butadiene-styrene (SBS), or styrene-ethylene-butadiene-styrene (SEBS). These elastomers have high adhesion strength, and remain durable after battery cycles. More preferably, the thermoplastic elastomer may be a thermoplastic elastomer with added hydrogen (hereinafter, "hydrogenated thermoplastic elastomer"). The hydrogenated thermoplastic elastomer is used because it improves the solubility for the solvent used when forming the solid electrolyte layer 10, in addition to improving reactivity and bondability.

The binder is added in an amount of, for example, preferably 0.01 mass % to 5 mass %, more preferably 0.1 mass % to 3 mass %, further preferably 0.1 mass % to 1 mass %. When added in an amount of 0.001 mass % or more, the binder is able to more easily form a bond, and provide sufficient adhesion strength. With a binder content of 5 mass % or less, deterioration of battery characteristics such as charge and discharge characteristics becomes unlikely to occur, and the charge and discharge characteristics become less likely to deteriorate even when changes occur in binder properties (for example, hardness, tensile strength, tensile elongation) in, for example, a low temperature region.

C. Positive Electrode Layer

The following describes the positive electrode layer of the present embodiment. The positive electrode layer 20 of the present embodiment contains the solid electrolyte 1 and the positive-electrode active material 3. In order to provide electron conductivity, the positive electrode layer 20 may further contain a conductive auxiliary agent such as acetylene black or Ketjen black, and a binder, as required. However, desirably, a conductive auxiliary agent and a binder should be added in amounts small enough not to interfere with battery performance, because these materials affect battery performance when added in large amounts. The weight ratio of solid electrolyte 1 and positive-electrode active material (solid electrolyte:positive-electrode active material) is preferably within a range of 50:50 to 5:95, more preferably 30:70 to 10:90. The positive-electrode active material 3 has a volume fraction of preferably 60% to 80% with respect to the total volume of positive-electrode active material 3 and solid electrolyte 1. This volume fraction is preferred because it makes it easier to provide both a lithium ion conduction pathway and an electron conduction pathway in the positive electrode layer 20.

The metal foil forming the positive-electrode collector 6 may be, for example, a metal such as SUS, aluminum, nickel, titanium, or copper.

C-1. Solid Electrolyte

The solid electrolyte is as described above, and is not described again.

C-2. Binder

The binder is as described above, and is not described again.

C-3. Positive-Electrode Active Material

The positive-electrode active material 3 of the present embodiment is described below. The material of the positive-electrode active material 3 of the present embodiment may be, for example, a lithium-containing transition metal oxide. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, and compounds obtained by substituting the transition metal in these compounds with one or more dissimilar elements. Examples of compounds obtained by substituting the transition metal in the foregoing compounds with one or more dissimilar elements include known compounds such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$. The materials used for the positive-electrode active material 3 may be used alone or in a combination of two or more.

The positive-electrode active material 3 may have a particle diameter of, for example, 1 μm to 10 μm, though it is not particularly limited.

D. Negative Electrode Layer

The following describes the negative electrode layer 30 of the present embodiment. The negative electrode layer 30 of the present embodiment contains the solid electrolyte 5 and the negative-electrode active material 4. In order to provide electron conductivity, the negative electrode layer 30 may further contain a conductive auxiliary agent such as acetylene black or Ketjen black, and a binder, as required. However, desirably, a conductive auxiliary agent and a binder should be added in amounts small enough not to interfere with battery performance, because these materials affect battery performance when added in large amounts. The weight ratio of solid electrolyte 5 to negative-electrode active material (solid electrolyte:negative-electrode active material) is preferably within a range of 5:95 to 60:40, more preferably 30:70 to 50:50. The negative-electrode active material 4 has a volume fraction of preferably 60% to 80% with respect to the total volume of the negative-electrode active material 4 and the solid electrolyte 5. This volume fraction is preferred because it makes it easier to provide both a lithium ion conduction pathway and an electron conduction pathway in the negative electrode layer 30.

The metal foil forming the negative-electrode collector 7 may be, for example, a metal such as SUS, copper, and nickel.

D-1. Solid Electrolyte

The solid electrolyte is as described above, and is not described again.

D-2. Binder

The binder is as described above, and is not described again.

D-3. Negative-Electrode Active Material

The negative-electrode active material 4 of the present embodiment is described below. The material of the negative-electrode active material 4 of the present embodiment may be a known material, for example, lithium, or a metal that readily forms an alloy with lithium (e.g., indium, tin, and silicon), a carbon material (e.g., hardcarbon, graphite), and $Li_4Ti_5O_{12}$ or $SiO_x$.

The negative-electrode active material 4 has a particle diameter of, for example, 1 μm to 15 μm, though it is not particularly limited.

Manufacturing Method

Figure 6:
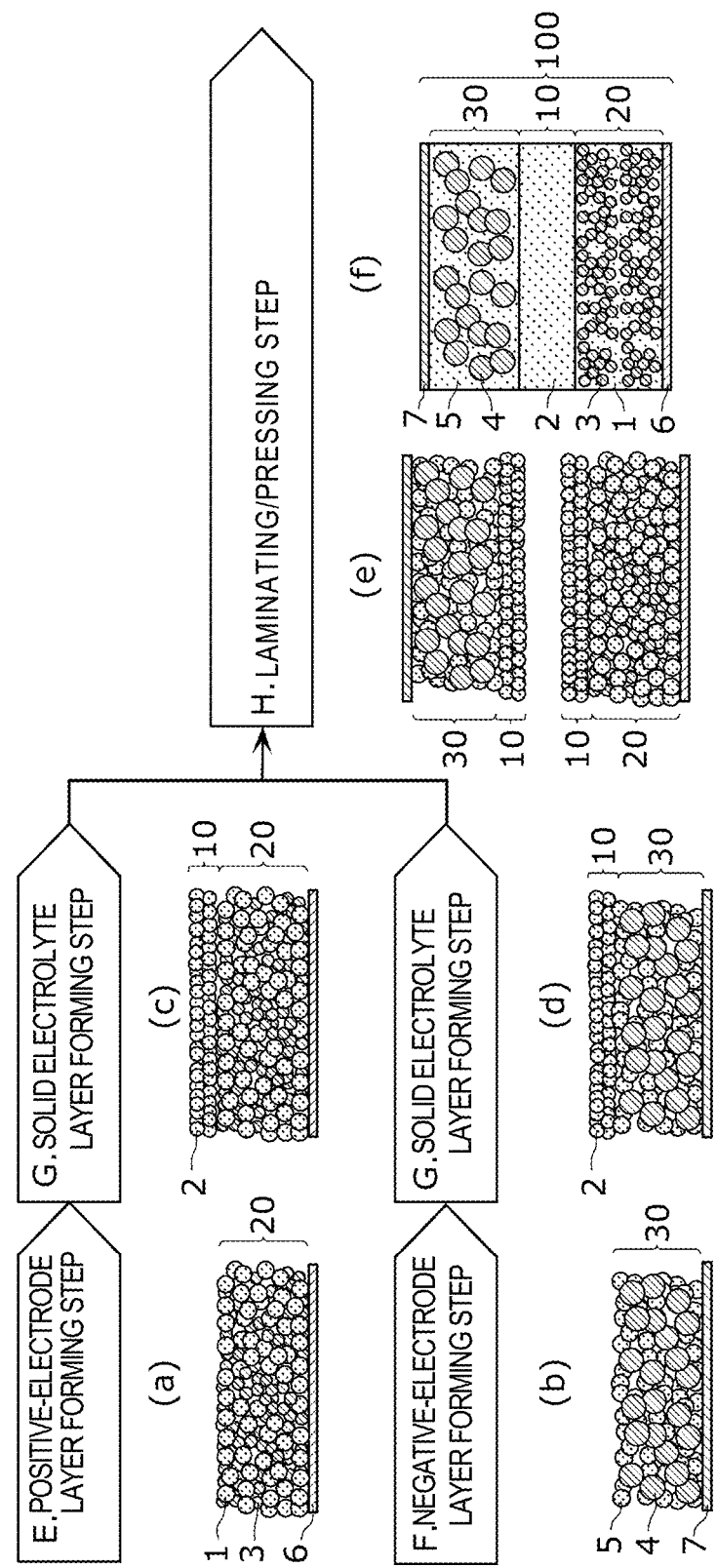
FIG. 6 is a schematic diagram representing a solid-state battery manufacturing method of the embodiment, with cross sections.

A method for manufacturing a solid-state battery of the present embodiment is described below, with reference to FIG. 6. Specifically, the following describes a method for manufacturing the solid-state battery 100 that includes the positive electrode layer 20 and the negative electrode layer 30. FIG. 6 is a schematic diagram representing an exemplary method of manufacture of the solid-state battery 100, along with exemplary cross sections.

The method for manufacturing the solid-state battery 100 includes, for example, the following steps:

a positive electrode layer forming step of forming the positive electrode layer 20 on the positive-electrode collector 6 (FIG. 6, (a));

a negative electrode layer forming step of forming the negative electrode layer 30 on the negative-electrode collector 7 (FIG. 6, (b));

a solid electrolyte layer forming step of preparing the solid electrolyte layer 10 (FIG. 6, (c) and (d)); and a laminating and pressing step of laminating the positive electrode layer 20 formed on the positive-electrode collector 6, the negative electrode layer 30 formed on the negative-electrode collector 7, and the solid electrolyte layer 10 in such a manner that the solid electrolyte layer 10 is interposed between the positive electrode layer 20 and the negative electrode layer 30, and externally applying pressure to the positive-electrode collector 6 and the negative-electrode collector 7 from both sides (FIG. 6, (e) and (f)).

The following describes each step in detail.

E. Positive Electrode Layer Forming Step

In the present embodiment, formation of the positive electrode layer 20 (positive electrode layer forming step) may be achieved by the process (1) or (2) below, for example.

(1) The positive electrode layer 20 of the present embodiment may be formed using, for example, a process that includes:

a coating step of (i) dispersing the positive-electrode active material 3 and the solid electrolyte 1 in an organic solvent, (ii) preparing a slurry as a positive electrode mixture after optionally dispersing a binder and a conductive auxiliary agent (not illustrated) in the organic solvent, and (iii) applying the positive electrode mixture to a surface of the positive-electrode collector 6;

a drying and firing step of heating and drying the coating to remove the organic solvent; and a coating and pressing step of pressing the dry coating formed on the positive-electrode collector 6.

In the present embodiment, the positive electrode mixture is an example of an active material mixture.

The method used to apply the slurry is not particularly limited, and this may be achieved by known methods using, for example, a blade coater, a gravure coater, a dip coater, a reverse coater, a roll knife coater, a wire bar coater, a slot die coater, an air knife coater, a curtain coater, or an extrusion coater, or a combination of these.

Examples of the organic solvent used to prepare a slurry include heptane, xylene, and toluene. However, the organic solvent is not limited to these, and may be appropriately selected from organic solvents that do not chemically react with the positive-electrode active material 3 and other components.

The drying and firing step is not particularly limited, as long as it can dry the coating and remove the organic solvent. For example, a known method using a heater or the like may be used. The coating and pressing step is not particularly limited either, and, for example, a known pressing method using a press or the like may be used.

(2) Alternatively, the positive electrode layer 20 of the present embodiment may be formed using, for example, a process that includes a mixture adjusting step, a powder layering step, and a powder pressing step. In the mixture adjusting step, the solid electrolyte 1 and the positive-electrode active material 3 are prepared in powder form (not a slurry), and, after optionally preparing a binder and a conductive auxiliary agent (not illustrated), the materials are mixed while being applied moderate shear or pressure to produce a positive electrode mixture as a homogenous dispersion of positive-electrode active material 3 and solid electrolyte 1. In the powder layering step, the positive electrode mixture is evenly layered to obtain a laminate. The powder pressing step presses the laminate obtained in the powder layering step.

Layering of the powdery positive electrode mixture is advantageous because it eliminates the drying step, and lowers manufacturing costs. Another advantage is that the solvent, which affects battery performance, does not remain in the positive electrode layer 20 after the formation.

F. Negative Electrode Layer Forming Step

Formation of the negative electrode layer 30 of the present embodiment (negative electrode layer forming step) can be achieved by basically the same process described in the positive electrode layer forming step in the foregoing section E, except that the materials used are for the negative electrode layer 30.

The negative electrode layer 30 may be produced by a process in which, for example, a negative electrode mixture prepared as a slurry by mixing the solid electrolyte 5, the negative-electrode active material 4, and, optionally, a binder and a conductive auxiliary agent (not illustrated) is applied onto the negative-electrode collector 7, followed by drying (process (1) in E. Positive Electrode Layer Forming Step). Alternatively, the negative electrode layer 30 may be produced by a process in which a powdery (not a slurry) negative electrode mixture is layered on the negative-electrode collector 7 (process (2) in E. Positive Electrode Layer Forming Step). In the present embodiment, the negative electrode mixture is an example of an active material mixture.

Layering of the powdery negative electrode mixture is advantageous because it eliminates the drying step, and lowers manufacturing costs. Another advantage is that the solvent, which affects the capacity of the solid-state battery, does not remain in the negative electrode layer 30 after the formation.

G. Solid Electrolyte Layer Forming Step

The solid electrolyte layer 10 of the present embodiment can be produced using the same process described in the positive electrode layer forming step in the foregoing section E, except that, for example, the solid electrolyte 2 and an optional binder are dispersed in an organic solvent to produce a slurry, and the slurry is applied onto the positive electrode layer 20 and/or the negative electrode layer 30.

Alternatively, the solid electrolyte layer 10 may be formed on a substrate such as a polyethylene terephthalate (PET) film in the manner described above, and may be laminated on the positive electrode layer 20 and/or the negative electrode layer 30.

H. Laminating and Pressing Step

In the laminating and pressing step, the positive electrode layer 20 formed on the positive-electrode collector 6, the negative electrode layer 30 formed on the negative-electrode collector 7, and the solid electrolyte layer 10 after the forming step are laminated in such a manner that the solid electrolyte layer 10 is interposed between the positive electrode layer 20 and the negative electrode layer 30 (laminating step). This is followed by externally applying pressure to the positive-electrode collector 6 and the negative-electrode collector 7 from both sides (pressing step) to obtain the solid-state battery 100.

The purpose of pressing is to increase the density of the positive electrode layer 20, the negative electrode layer 30, and the solid electrolyte layer 10. With increased density, lithium ion conductivity and electron conductivity can improve in the positive electrode layer 20, the negative electrode layer 30, and the solid electrolyte layer 10, and a solid-state battery of desirable battery characteristics can be obtained.

In the solid-state battery manufactured by the method of the present embodiment, at least one of the positive electrode mixture and the negative electrode mixture contains fine particles of solid electrolyte material. With fine particles of solid electrolyte material contained in the positive electrode layer 20, the negative electrode layer 30, and the solid electrolyte layer 10, the solid electrolyte forms a network of fine fibers or particles. The density of the positive electrode layer 20 and the negative electrode layer 30 can be varied by adjusting the applied pressure, and the time and temperature of applied pressure in the pressing step, and the fine particles of solid electrolyte material contained in each layer can be adjusted for ease of necking and shape by adjusting density.

In the pressing step, the positive-electrode active material 3 and the negative-electrode active material 4 are densified under the load of the applied predetermined pressure. Upon removing the applied pressure, the positive-electrode active material 3 or negative-electrode active material 4 is acted upon by a force that acts to release the pressure (hereinafter, referred to as "springback"). Under the stress of applied pressure in the pressing step, the fine particles of solid electrolyte contained in the positive electrode layer 20 or negative electrode layer 30 are necked, and the solid electrolytes become joined to one another or to the active material at the interface as the necked solid electrolyte material stretches under the springback force. The result is formation of the porous structure. The porous structure can be adjusted by varying the content and particle diameter of the fine particles, or by varying the pressure conditions. The porous structure may be a structure constructed from the fibrous solid electrolyte and fine spaces, or a structure in which fine particulate solid electrolytes are joined to one another via junctions, and creating a scattering of holes.

Specific Examples of Manufacturing Method

The following describes specific examples of the solid-state battery manufacturing method according to the present embodiment. However, the manufacturing method is not limited to these examples. In all examples of manufacturing method, the procedures were performed in a glove box or in a dry room at a controlled dew point of −45° C. or less, unless otherwise specifically stated.

The solid electrolyte material and the positive-electrode active material used in the solid-state battery manufacturing method of the present embodiment described above were weighed to make the volume fraction of positive-electrode active material to solid electrolyte be in a range of 6:4 to 8:2, and the positive electrode mixture was produced in the manner described above. That is, the positive electrode mixture was produced by mixing the positive-electrode active material and the solid electrolyte in such proportions that the volume fraction of the positive-electrode active material with respect to the total volume of positive-electrode active material and solid electrolyte was 60% to 80%. In the present embodiment, the positive electrode mixture is an example of an active material mixture. The solid electrolyte used to produce the positive electrode mixture contained a solid electrolyte particle A representing particles having a particle diameter of more than 300 nm and 1,500 nm or less (number average particle diameter of 800 nm), and a solid electrolyte particle B representing particles having a particle diameter of 10 nm or more and 300 nm or less (number average particle diameter of 80 nm). That is, the positive electrode mixture was produced by mixing the positive-electrode active material with solid electrolyte particle A and solid electrolyte particle B. In the present embodiment, particle diameter means a Feret diameter. In producing the positive electrode mixture, it is desirable to mix the positive-electrode active material with solid electrolyte particle B first, before mixing solid electrolyte particle A. In this way, it is possible to improve the dispersibility of solid electrolyte particle B having a smaller particle diameter than solid electrolyte particle A. The positive electrode mixture was produced by mixing solid electrolyte particle A and solid electrolyte particle B at a mixture ratio of 95:5 to 20:80. That is, the positive electrode mixture was produced by mixing solid electrolyte particle A and solid electrolyte particle B in such proportions that the volume fraction of solid electrolyte particle A with respect to the total volume of solid electrolyte particle A and solid electrolyte particle B was 20% to 95%. Solid electrolyte particle A may have a particle diameter of, for example, 330 nm to 1,500 nm, or 350 nm to 1,500 nm.

Figure 7:
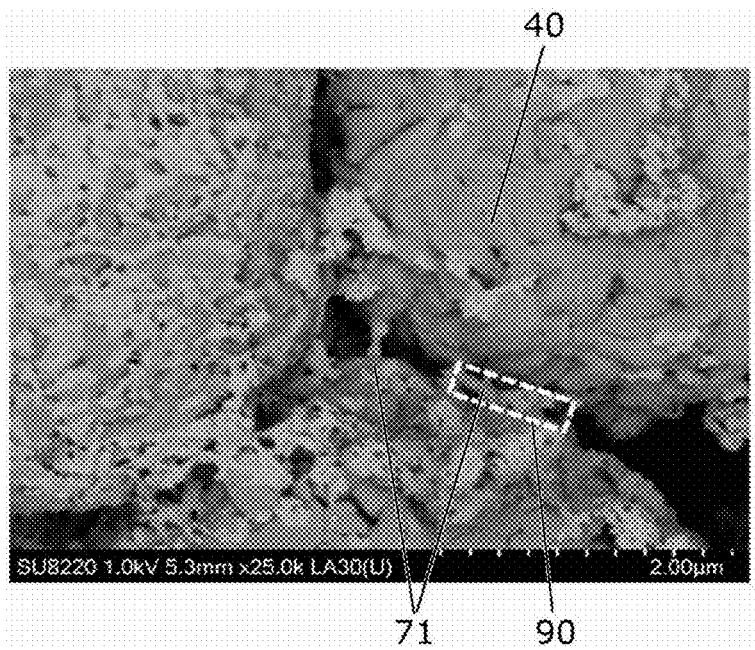
FIG. 7 shows an example of a SEM image of the positive electrode layer of the embodiment.
Figure 8:
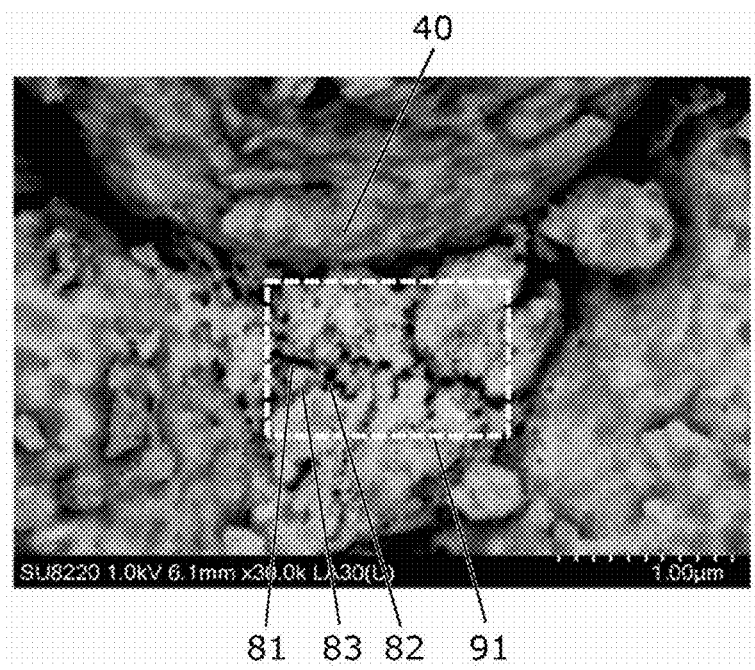
FIG. 8 shows another example of a SEM image of the positive electrode layer of the embodiment.

The positive electrode mixture was used to produce the positive electrode layer, using the drying method in process (2) of the positive electrode layer forming step described in the foregoing section E. FIGS. 7 and 8 show scanning electron micrographs (SEM) magnifying a cross section of the positive electrode layer actually produced. The positive-electrode active material and the solid electrolyte are described below in detail with regard to their shapes, with reference to FIGS. 7 and 8. FIG. 7 shows a SEM of when the solid electrolyte particle B mixed with solid electrolyte particle A had a volume fraction of 5% to 10% with respect to the total volume of solid electrolyte particle A and solid electrolyte particle B. FIG. 8 shows a SEM of when the volume fraction of solid electrolyte particle B was 40% to 60%.

As shown in FIG. 7, fine solid electrolyte particles having a particle diameter of 300 nm or less were partly joining to one another via a necked fiber shape 71 at the surface of the positive-electrode active material 40. The necked fiber shape 71 follows the shape changes created by expansion and contraction of the positive-electrode active material 40 due to charge and discharge, and acts to relieve stress. The necked fiber shape 71 is an example of a fibrous solid electrolyte.

The necked fiber shape 71 more easily occurs when the volume fraction of solid electrolyte particle B is 5% or more in the solid electrolyte. That is, the stress relieving effect is more easily produced with the presence of the necked fiber shape 71.

The necked fiber shape occurred in increased numbers of locations with increasing volume fractions of solid electrolyte particle B, and, as shown in FIG. 8, fine particulate solid electrolytes 83, joined to one another not via the necked fiber shape but via junctions 82 formed by solid electrolyte material, were observed with a large number of fine spaces 81 occurring in the solid electrolyte. The fine particulate solid electrolytes 83 were also partly in contact with the positive-electrode active material 40. With the junctions 82 of solid electrolyte material parting the fine spaces 81, the fine spaces 81 are also able to produce the stress relieving effect, as is the necked fiber shape. Preferably, the junctions 82 include a junction having a width of 10 nm to 300 nm. With a junction 82 having a width of 10 nm to 300 nm, the positive electrode layer 20 forms a structure satisfying both strength and flexibility, and the stress relieving effect improves.

The volume fraction of solid electrolyte particle B is adjustable to meet the specifications of the solid-state battery used. The number of fine spaces 81 increases, and the stress relieving effect is more easily produced when the volume fraction of solid electrolyte particle B is 80% or less. It is accordingly desirable that the volume fraction of solid electrolyte particle B be within a range of 5% to 80%.

The characteristic of the shape that produces the stress relieving effect is that, by adding fine solid electrolyte particles such as solid electrolyte particle B, the solid electrolyte present between particles of positive-electrode active material includes solid electrolyte particles that are joined to one another via the solid electrolyte material, with the predetermined space being present in the solid electrolyte. In other words, the characteristic of the shape that produces the stress relieving effect is that a part of the solid electrolyte is the porous solid electrolyte. Here, having the predetermined space is defined as follows. In a two-dimensional observed image of the solid electrolyte between particles of positive-electrode active material, it is desirable that the space have an area fraction of 5% to 90% with respect to the total area of an extracted region of solid electrolyte particles joining to one another via a fiber shape or a junction having a width of 300 nm or less, for example, such as in the region 90 shown in FIG. 7, or the region 91 shown in FIG. 8. That is, it is desirable that the space created by pores have an area fraction of 5% to 90% with respect to the total area of the porous solid electrolyte in a two-dimensional observed image. With an area fraction of 5% to 90%, it becomes easier to provide both the stress relieving effect and an ion conduction pathway.

The filamentous (fibrous) solid electrolyte, or fine particulate solid electrolytes joined to one another via junctions serve as an ion conduction pathway by being in contact with the surface of positive-electrode active material, and this should improve ion conductivity in the positive electrode layer. The ion conductivity can be further improved when the positive-electrode active material and the solid electrolyte have an increased contact area.

Figure 9:
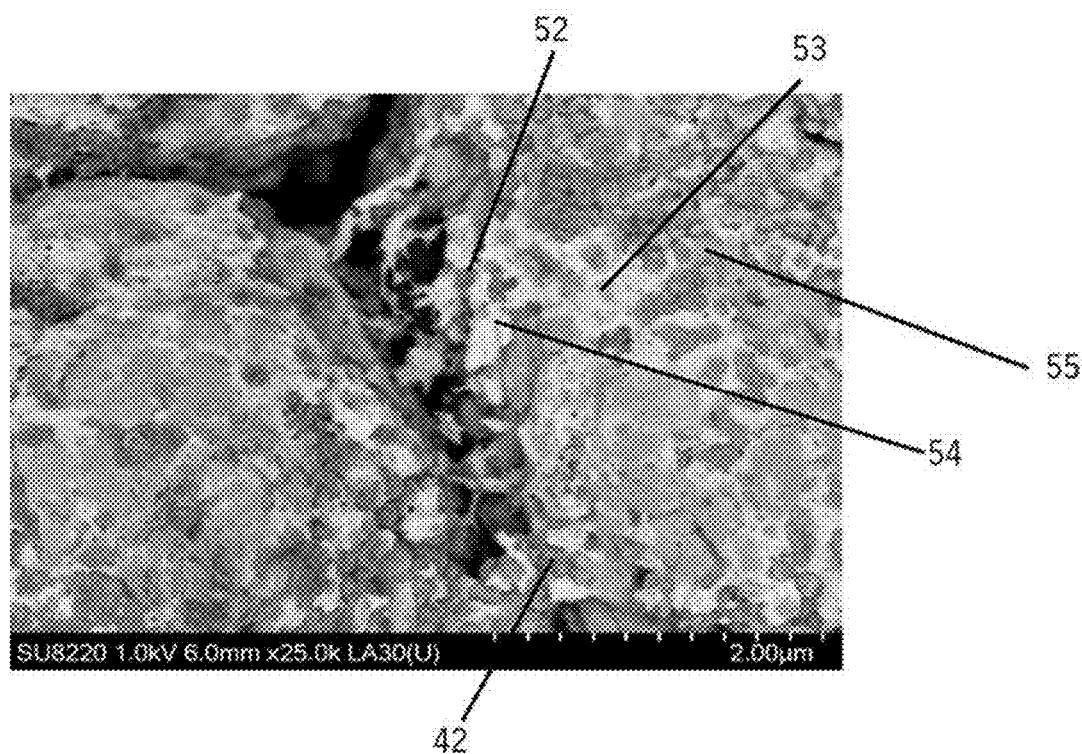
FIG. 9 shows yet another example of a SEM image of the positive electrode layer of the embodiment.

The contact area between the positive-electrode active material and the solid electrolyte can be increased by precoating the surface of positive-electrode active material with solid electrolyte particles. FIG. 9 shows a SEM of a positive-electrode active material surface coated with solid electrolyte particles. As can be seen in FIG. 9, a coating layer 53 of solid electrolyte particles is formed at least partly around the positive-electrode active material 42, and the porous solid electrolyte 52 is present between particles of the positive-electrode active material 42 coated with the coating layer 53.

In this case, the positive-electrode active material, the solid electrolyte particle A, and the solid electrolyte particle B are mixed beforehand in the step of preparing a positive electrode mixture in process (2) of the positive electrode layer forming step described in the foregoing section E, and the pressure and shear force are adjusted in such a manner that the solid electrolyte particles stick to the surface of positive-electrode active material as the solid electrolyte particles become pulverized and stretched. This creates the shape in which the solid electrolyte is coating the surface of the positive-electrode active material. Here, when the solid electrolyte contains only the solid electrolyte particle B representing finer particles, the particles attach to the positive-electrode active material surface in a localized fashion, and do not easily disperse. It is accordingly desirable to also mix solid electrolyte particle A, which is larger in size than solid electrolyte particle B. That is, in forming the coating layer 53, it is desirable to simultaneously mix solid electrolyte particles having a number average particle diameter of larger than 300 nm, and solid electrolyte particles having a number average particle diameter of 300 nm or less.

The coating layer 53 is a mixture of solid electrolyte particles having a particle diameter of larger than 300 nm, and solid electrolyte particles having a particle diameter of 300 nm or less. As shown in FIG. 9, the coating layer 53 has a surface with a portion 54 where solid electrolyte particles having a particle diameter of larger than 300 nm are present, and a portion 55 where solid electrolyte particles having a particle diameter of 300 nm or less are present. In the solid electrolyte particles constituting the coating layer 53, solid electrolyte particles having a particle diameter of larger than 300 nm have a volume fraction of desirably in a range of 20% to 95%. With this volume fraction, the coating layer 53 can be formed more uniformly over the positive-electrode active material 42.

The coating layer 53 has a thickness of preferably in a range of 10 nm to 300 nm, more preferably 20 nm to 200 nm. With a thickness of 10 nm or more, the coating layer 53 is able to more easily conform to the irregularities of the positive-electrode active material 42, and forms a more stable coating layer. When the coating layer 53 has a thickness of 300 nm or less, the positive-electrode active material in the positive electrode layer can maintain its fraction, thus maintaining the battery capacity.

The foregoing detailed descriptions of the present embodiment are based on the positive-electrode active material and the solid electrolyte of the positive electrode layer. However, the negative-electrode active material and the solid electrolyte of the negative electrode layer can produce the same effect, and the present embodiment is not limited to the positive electrode layer.

Other Embodiments

The present disclosure is not limited to the embodiments above. The embodiments are illustrative, and all modifications based on the same technical idea and having essentially the same configurations, and producing the same or similar effect as the foregoing embodiments are intended to fall within the technical scope of the present disclosure defined in the claims. Changes to the embodiments as may be conceivable by a skilled person, and embodiments based on combinations of parts of the foregoing embodiments are also intended to fall within the scope of the present disclosure, provided that such changes do not depart from the gist of the present disclosure.

A solid-state battery according to the present disclosure has potential use in a wide range of battery applications, including, for example, power supplies for portable electronic devices, and on-board batteries.

What is claimed is:
1. A solid-state battery comprising:
   a positive-electrode collector;
   a negative-electrode collector;
   a positive electrode layer formed on a surface of the positive-electrode collector closer to the negative-electrode collector, and containing a positive-electrode active material and a first solid electrolyte;
   a negative electrode layer formed on a surface of the negative-electrode collector closer to the positive-electrode collector, and containing a negative-electrode active material and a second solid electrolyte; and
   a solid electrolyte layer disposed between the positive electrode layer and the negative electrode layer and containing a third solid electrolyte, wherein at least one of the first solid electrolyte and the second solid electrolyte contains a porous solid electrolyte, and wherein the porous solid electrolyte includes a plurality of fibrous solid electrolytes having necked fiber shapes.

2. The solid-state battery according to claim 1, wherein the at least one of the first solid electrolyte and the second solid electrolyte contains a plurality of first solid electrolyte particles and a plurality of second solid electrolyte particles, each of the plurality of second solid electrolyte particles being smaller in volume than each of the plurality of first solid electrolyte particles such that the plurality of second solid electrolyte particles are different from the plurality of first solid electrolyte particles, wherein the plurality of second solid electrolyte particles contain the plurality of fibrous solid electrolytes having necked fiber shapes such that the plurality of second solid electrolyte particles are necked with each other, and wherein a volume fraction of the plurality of second solid electrolyte particles is 5% to 90% of a total volume of the plurality of first solid electrolyte particles and the plurality of second solid electrolyte particles.

3. The solid-state battery according to claim 1, wherein the plurality of fibrous solid electrolytes are in contact with at least one of the positive-electrode active material and the negative-electrode active material.

4. The solid-state battery according to claim 1, wherein the plurality of fibrous solid electrolytes contain a fiber having a width of 10 nm to 300 nm.

5. The solid-state battery according to claim 1, wherein the porous solid electrolyte contains a plurality of fine particulate solid electrolytes, and the plurality of fine particulate solid electrolytes are joined to one another via solid electrolyte junctions.

6. The solid-state battery according to claim 5, wherein the plurality of fine particulate solid electrolytes are partly in contact with at least one of the positive-electrode active material and the negative-electrode active material.

7. The solid-state battery according to claim 5, wherein the solid electrolyte junctions include a solid electrolyte junction having a width of 10 nm to 300 nm.

8. The solid-state battery according to claim 1, wherein an area fraction of a space created by pores in the porous solid electrolyte is 5% to 90% with respect to a total area of the porous solid electrolyte, as measured in a two-dimensional observed image.

9. The solid-state battery according to claim 1, wherein at least one of the positive-electrode active material and the negative-electrode active material has a surface coating layer containing another part of the at least one of the first solid electrolyte and the second solid electrolyte.

10. The solid-state battery according to claim 9, wherein the surface coating layer contains: a plurality of solid electrolyte particles each having a particle diameter of 300 nm or less; and a plurality of solid electrolyte particles each having a particle diameter of larger than 300 nm.

11. The solid-state battery according to claim 10, wherein the plurality of solid electrolyte particles each having a particle diameter of larger than 300 nm has a volume fraction of 20% to 95% with respect to a total volume of the solid electrolyte particles.

12. The solid-state battery according to claim 1, wherein the positive-electrode active material has a volume fraction of 60% to 80% with respect to a total volume of the positive-electrode active material and the first solid electrolyte.

13. The solid-state battery according to claim 1, wherein the negative-electrode active material has a volume fraction of 60% to 80% with respect to a total volume of the negative-electrode active material and the second solid electrolyte.

14. A method for manufacturing a solid-state battery that includes a positive electrode layer and a negative electrode layer, the method comprising at least one of:

forming the positive electrode layer with a first active powder material mixture produced by mixing powders of a positive-electrode active material, a plurality of first solid electrolyte particles each having a particle diameter larger than 300 nm, and a plurality of second solid electrolyte particles each having a particle diameter of 300 nm or less; and forming the negative electrode layer with a second active powder material mixture produced by mixing powders of a negative-electrode active material, a plurality of first solid electrolyte particles each having a particle diameter of larger than 300 nm, and a plurality of second solid electrolyte particles each having a particle diameter of 300 nm or less, wherein the method further comprises:

pressing one of the positive electrode layer and the negative electrode layer and the other of the positive electrode layer and the negative electrode layer in a stacked formation, wherein the pressing includes forming a porous solid electrolyde by a plurality of fibrous solid electrolytes in which at least some parts of the plurality of second solid electrolyte particles are necked with each other and form fiber shapes due to springback, and wherein the forming of the first active powder material mixture and the second active powder material mixture comprises mixing the plurality of first solid electrolyte particles and the plurality of second solid electrolyte particles so that a volume fraction of the plurality of second solid electrolyte particles is 5% to 90% of a total volume of the plurality of first solid electrolyte particles and the plurality of second solid electrolyte particles.

15. The method according to claim 14, wherein the first active powder material mixture and the second active powder material mixture are produced by mixing the powders of the positive-electrode active material or the negative-electrode active material with the plurality of second solid electrolyte particles and then adding and mixing the plurality of first solid electrolyte particles.

16. The solid-state battery according to claim 6, wherein the junctions include a junction having a width of 10 nm to 300 nm.

* * * * *